Jan. 8, 1924. 1,479,976
J. L. WHEELER
SHUTTER CONTROL DEVICE FOR MEASURING AND COMPUTING MACHINES
Filed Jan. 31, 1921 3 Sheets-Sheet 1

Inventor:
John L. Wheeler.
By Elliott Nunn
his Attys.

Jan. 8, 1924.  1,479,976
J. L. WHEELER
SHUTTER CONTROL DEVICE FOR MEASURING AND COMPUTING MACHINES
Filed Jan. 31, 1921  3 Sheets-Sheet 3

Inventor:
John L. Wheeler.
By Elliott & Thurmer
his Attys.

Patented Jan. 8, 1924.

1,479,976

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

SHUTTER-CONTROL DEVICE FOR MEASURING AND COMPUTING MACHINES.

Application filed January 31, 1921. Serial No. 441,245.

*To all whom it may concern:*

Be it known that I, JOHN L. WHEELER, a citizen of the United States, residing in the city of St. Louis and State of Missouri, have invented new and useful Improvements in Shutter-Control Devices for Measuring and Computing Machines, of which the following is a specification.

This invention relates to measuring and cost-computing machines, and while features of the invention may be applied to machines for measuring different kinds of articles, in the present specification I have described the invention as applied to a fabric measuring and cost-computing machine. Such machines usually embody indicating means such as a dial and pointers that indicate the length of the article measured; such a machine also usually embodies a chart bearing computed figures, the computations being based on different prices per unit of measure. As the article to be measured is moved past or through the machine a measuring-roller is rotated and its movement is communicated to the chart and the indicating pointers. For practical reasons it is necessary to condense the computations on the chart and it is usual to provide computations corresponding to eighths of a yard. It may happen, however, that a purchaser desires some odd length of fabric not commensurable in the fractions indicated, for example, eighths, fourths of a yard, etc. With a machine having the characteristics described above, if it is attempted to sell an odd length, such as that suggested, for which there is no computed figure on the chart, one of the computed figures corresponding to the nearest computed length might be presented at the reading point of the chart in a position where it could be read although it would not be exactly aligned at the reading point. This is objectionable. The general object of the present invention is to provide simple means for preventing visibility of the chart except when the length-indicating means is indicating some measurement commensurate in the unit of measure or aliquot fractional divisions thereof and for which cost computations have been made, for example, eighths of a yard; in this way it is assured that there will be perfect correspondence between the indicated length and the computed figure which is based upon that length and a certain price per unit of measure. The invention contemplates the use of marking means for marking the point at which the measured length is to be severed, and one of the objects is to provide means whereby the marking means controls the visibility of the computed figures, thereby enabling the machine to mark and measure any odd length that may be required, but preventing any computed figure of the chart from being seen when such an odd length is measured.

Further objects of the invention will appear hereinafter.

The invention consists in the novel features, and in the general combination of parts to be particularly described hereinafter, all of which contribute to produce a simple and efficient shutter control device for measuring and computing machines. A preferred embodiment of my invention will be particularly described in the following specification, while the broad scope of my invention will be pointed out in the appended claims.

In the drawing,

Figure 6 particularly illustrates the driving train from the measuring-roller to the indicating mechanism.

Figure 1:
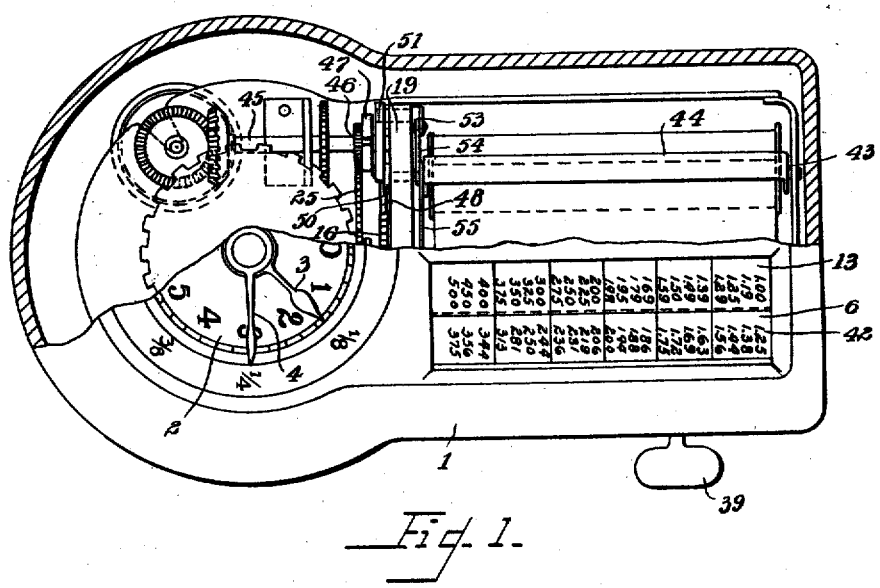
Figure 1 is a plan of a machine embodying the invention, broken away to illustrate parts of the mechanism.
Figure 2:
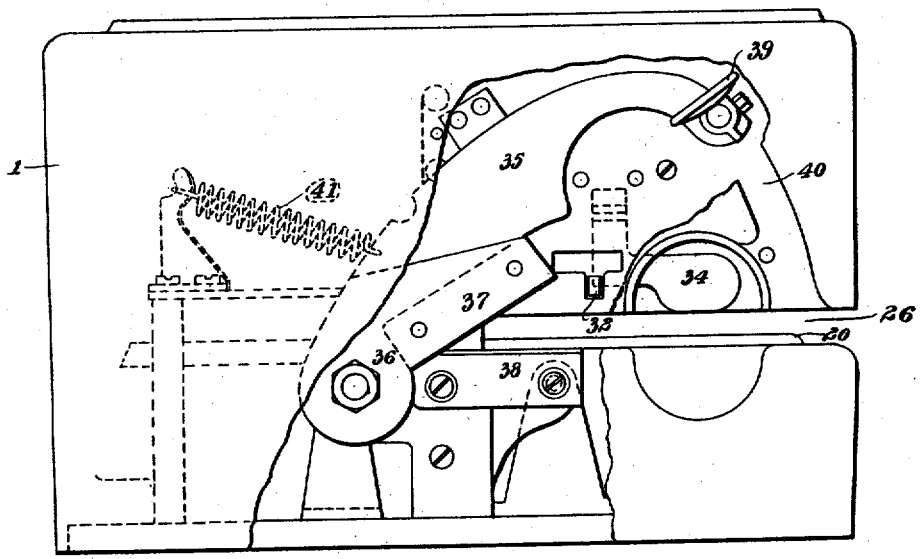
Figure 2 is a front elevation of the machine also partially broken away.

Referring more particularly to the parts, the machine to which I have applied the invention has a casing or case 1 (see Figs. 1 and 2). The machine includes indicating mechanism comprising a length-indicator for indicating the length of the article measured and cost-computing mechanism for indicating the price to be charged for the length of goods indicated. The upper portion of the case 1 has a dial 2 carrying a scale having large divisions numbered from one to twelve and representing yards. The entire circumference of the scale also bears fractional numbers, for example, ⅛, ¼, etc., which are aliquot divisions of the unit of measure or yard. Co-operating with these parts there is provided pointer-means comprising a units pointer 3 and a fraction pointer 4. These pointers are driven at a 12-to-1 ratio by any suitable driving means (not illustrated).

Figure 6:
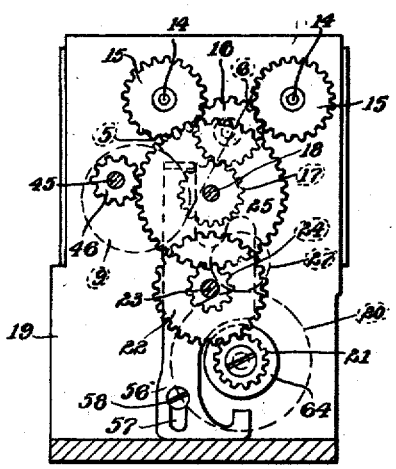
Figure 6 is a vertical cross-section taken about on the line 6—6 of Figure 5.
Figure 5:
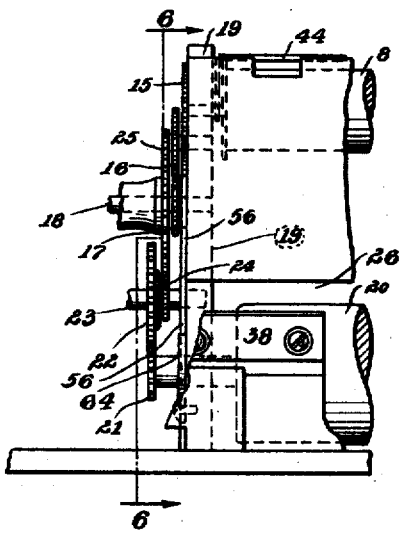
Figure 5 is a side elevation showing a part of the frame and mechanism of the instrument with the casing removed.

The computing mechanism includes two charts 5 and 6 indicated in Figure 6, the upper ends of which are wound upon two take-up rollers 7 and 8 (see Fig. 3), the lower ends of the charts being wound upon a spring roller or spring drum 9 as indicated in Figure 6. The take-up rollers 7 and 8 are disposed beneath windows, such as the window 10 provided in the cover plate 11 of the frame 12 (see Fig. 3), and adjacent to these windows price scales 13 are provided which carry figures disposed in rows, to indicate different prices per yard. The shafts 14 of the take-up rollers (see Figs. 3 and 6) carry gear wheels 15 which are driven by an idle pinion 16, the idle pinion being driven by a pinion 17 carried on a horizontal shaft 18. These gears and shafts are all supported on a vertical frame plate 19 (see Fig. 5). The shaft 18 is driven from a measuring-roller 20, the shaft of which carries a pinion 21 meshing with a large gear wheel 22 on a counter-shaft 23, and shaft 23 carries a pinion 24 which meshes with a large gear wheel 25 carried by the aforesaid shaft 18.

Figure 3:
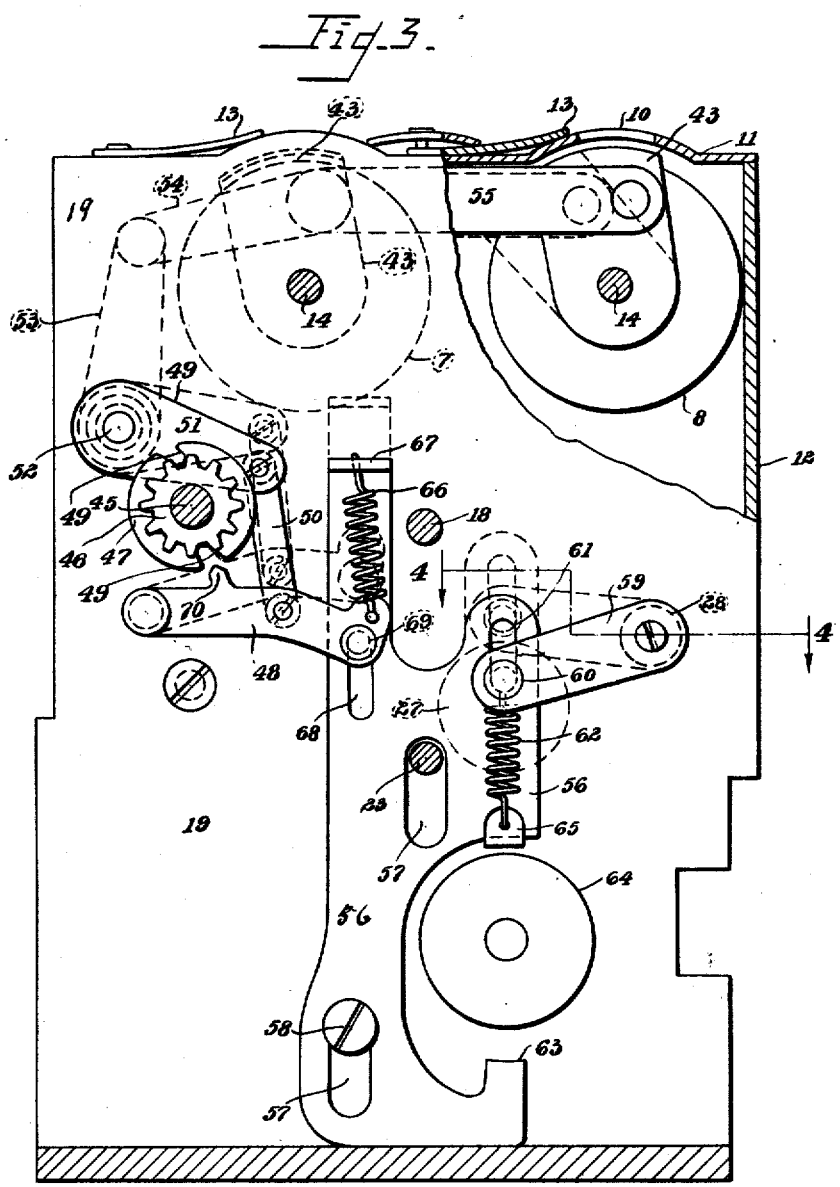
Figure 3 is a vertical section through the machine partially broken away and with the casing of the machine omitted, particularly illustrating the shutter mechanism and the means for controlling the same; in this view for the sake of clearness the driving train for the indicating mechanism is omitted.
Figure 4:
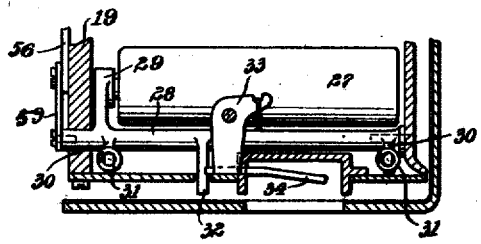
Figure 4 is a horizontal section taken about on the line 4—4 of Figure 3 and further illustrating the construction and operation of the controlling means for the shutter mechanism.

The casing 1 of the machine provides a horizontal gap or throat 26 (see Fig. 2) through which the fabric to be measured is pulled; the upper face of the measuring roller 20 lies in this gap, and co-operating with the measuring-roller there is provided a presser-roller 27 (see Figs. 3 and 4). This presser-roller is carried on a presser-roller frame which comprises a rock shaft 28 and an arm 29 which carries the presser-roller. The presser-roller frame also includes short arms 30 to which springs 31 are attached which operate to pull the presser-roller down onto the upper face of the measuring roller. Means is provided for latching the presser-roller in an elevated position when it is raised. For this purpose the rock shaft 28 is provided with an arm 32 with which co-operates a spring-actuated latch 33 having a thumb lever 34 which is accessible from the outside of the machine (see Fig. 2), to enable the presser-roller frame to be released when desired. The arm 32 not only serves the purpose of co-operating with the latch 33, but it also projects into the path of a marking lever or knife lever 35 (see Fig. 2) which is pivoted at 36 and carries a blade 37 to co-operate with a fixed blade 38 to perform the function of shears to snip the edge of the fabric to indicate where it is to be cut off. This knife lever 35 may be operated by a thumb plate 39 located outside of the casing and connected to the knife lever through a slot 40 in the casing. The knife lever 35 is normally held elevated by a spring 41.

Means is provided which will permit the operation of the knife lever 35 in any position of the pointers 3 and 4 of the length-indicator, but this means operates in such a way, that unless these pointers are indicating some measurement which is commensurate in the unit and aliquot fractional divisions thereof, the operation of the shutter will be automatically inhibited, that is to say, the computed figures, such as the figures 42 on the chart 6 will not be visible. This is accomplished preferably by means of shutter mechanism including two shutters 43 (see Fig. 3) which are pivotally supported on the shafts 14 of the take-up rollers, the body of each shutter being in the form of a bar 44 which extends longitudinally under the cover-plate 11 and near the face of its corresponding chart. These shutters are preferably controlled so that they are normally closed and will not open when the knife lever is operated if the length-indicator comprising the pointers 3 and 4, is indicating any odd measurement for which no computed figure is found on the chart. However, if the pointers 3 and 4 are indicating any usual or regular measurement, such as 1¼ yards, then the operation of the knife lever will move the shutters 43 to their open position and display the computed figure on the charts. The shutter mechanism may be controlled from the knife lever 35 in any suitable manner. It is preferably controlled indirectly by the knife lever through the agency of the presser-roller frame. The controlling mechanism for the shutters will now be described.

Referring to Figures 3 and 6, there is provided a horizontal shaft 45 which carries a pinion 46 meshing with the large gear wheel 25. The pinion 46 and gear wheel 25 are so proportioned that the shaft 45 will be driven in synchrony with the pointers 3 and 4 and the charts 5 and 6. The shaft 45 carries a locking-member in the form of a locking-disc or wheel 47, and this disc co-operates with an actuating member or actuating lever 48 which is connected to the shutters to actuate them. The actuating lever and the locking-disc 47 are provided with co-operating means operating in such a way that when the pointers 3 and 4 are indicating any measurement commensurate in yards and eighths of a yard the locking disc will permit a movement of the lever 48 in a direction to open the shutters. For this purpose gears 25 and 46 are proportioned so as to give the disc a half-revolution to correspond with every eighth-yard advance of the pointer 4, and in diametrically opposite points the edge of the disc is provided with slots or notches 49. In order to enable the lever 48 to actuate the shutters, the lever is connected by a link 50 with an arm 51 carried by a stub-shaft 52 which passes through the frame plate 19 and carries an arm 53 on the other side of the frame plate; this arm 53 is connected by a link 54 with the adjacent shutter 43, and the two shutters are connected by a link 55 (see Fig. 3). Machines of this general type are usually provided with a brake plate which is controlled by the presser-roller frame in such a way that when the presser-roller is raised or moved away from the measuring-roller a brake is applied to the measuring-roller to prevent any further rotation thereof; this is advisable because any rotation of the measuring-roller would, of course, be imparted to the indicating mechanism and this would produce an inaccurate indicating measurement in the machine. The movement of this brake plate is utilized to impart movement when possible to the actuating lever 48. Referring to Figure 3, 56 indicates a brake plate which is mounted to slide on the face of the vertical frame plate 19, being guided thereupon by slots 57 receiving a pin 58 and the shaft 23. The rock shaft 28 of the presser-roller frame extends through the frame plate 19 and carries a rigid arm 59 having a pin 60 which is received in a vertical slot 61 in the upper portion of the brake plate 56. When the presser-roller frame is raised, the arm 59 swings upwardly and a spring 62 attached to the pin 60 exerts an upward pull upon the brake plate so as to pull the shoe 63 of the brake plate against the lower face of a brake wheel 64 carried by the shaft of the measuring-roller 20. For this purpose the lower end of the spring 62 is attached to an integral bracket 65 formed on the brake plate. The vertical movement of the brake plate exerts a yielding force on the actuating lever 48; this yielding force is preferably exerted by means of a spring 66, the upper end of which is attached to a lug 67 at the upper end of the brake plate, the lower end of the spring being attached to the end of the lever 48. I prefer to provide a pin-and-slot connection between the lever 48 and the brake plate which will prevent any possibility of the lever 48 engaging the notches 49 when the presser-roller frame is in its depressed position. For this purpose I provide a slot 68 in the brake plate and a co-operating pin 69 in the end of the lever 48. With this arrangement the spring 66 can be constantly in tension and when the brake plate moves upwardly the spring will pull the lever 48 toward the locking-wheel 47. On the upper edge of the lever 48 a small dog 70 is provided and if one of the notches 49 happens to be in line with this dog, then the lever 48 will move upwardly and operate the shutters; otherwise the dog 70 will simply come against the periphery or face of the locking-wheel and the spring 66 will simply be extended without operating the shutter.

The general mode of operation of the entire machine will now be described.

In measuring with the machine the fabric is pulled through the gap 26 between the measuring-roller 20 and the presser-roller 27. The rotation of the measuring-roller is imparted by the pinion 21 and the gears driven thereby (see Fig. 6) to the gears 15 which are carried by the shafts 14 of the take-up rollers 7 and 9; this operates to rotate the take-up rollers and advance the charts 5 and 6 so as to bring the computed figures 42 of the charts into position under the windows 10. The shutters 43 however, normally are in a closed position, that is to say, they are in line with the windows 10 and prevent the computed figures on the charts from being seen. During all the time that the pointers 3 and 4 and the charts are advancing, the locking-wheel 47 is rotating. While this is taking place the brake plate 56 is in its depressed position, in which it is indicated in Figure 3; the upper end of the slot 68 being in engagement with pin 69, holds the lever 48 down with the lug 70 out of contact with the periphery of the locking-wheel 47. After the measurement has been taken the operator of the instrument presses down, on thumb-plate 39 and this depresses the knife lever 35 and the shears formed by the blades 37 and 38 operate to notch the edge of the fabric. As the knife lever 35 descends its lower edge beyond the blade 37 strikes the projecting end of arm 32 and rocks the presser roller frame into a position to elevate the presser-roller 27, that is to say, it rocks the rock shaft 28 on its longitudinal axis and this swings the arm 59 upwardly. This raises the brake-plate 56 and brings the brake shoe 63 against the brake wheel 64, thereby preventing any further movement of the measuring-roller. Raising the brake plate in this way will exert an upward pull in the spring 66 and this tends to move the lever 48 upwardly, that is to say, in a direction to open the shutters through the medium of link 50. If one of the notches 49 is in line with the dog 70, in other words, if the pointer 4 is indicating ⅛, ¼, etc., the shutters 43 will be opened automatically by the upward movement of the brake plate. If the locking-wheel 47 is in any other position, that is to say, if the pointer 4 is indicating any measurement incommensurate in eighths of a yard, then the face of the locking-wheel 47 will be engaged by the end of the dog 70, and of course, will prevent the upward movement of the lever 48 which would otherwise open the shutters. Hence, with this mode of operation, the operator of the machine can measure any amount required, whether it is commensurable in eighths or not, and the required amount can be marked by operating the knife lever 35, but the computations corresponding to the amount measured will only appear if it is commensurable in eighths of a yard. While I have employed eighths of a yard as the aliquot fractional division, of course, it is obvious that any other fractional division may be employed if desired.

It is understood that the embodiment of the invention described herein is only one of the many embodiments my invention may take, and I do not wish to be limited in the practice of my invention nor in my claims, to the particular embodiment set forth.

What I claim is:

1. In a fabric measuring and computing machine, the combination of a length-indicator for indicating the length of a measurement in units of measure and aliquot fractions thereof, a chart bearing computed figures based on different prices, and corresponding to the units and aliquot fractions thereof indicated by the length-indicator, a measuring-roller mounted so as to be rotated by the fabric when pulled through the machine, means driven by the measuring-roller for actuating the length-indicator and the chart, marking means for marking the fabric at the point where it is to be cut off, and means mounted in the machine and operating automatically to prevent the disclosure of the computed figures on the chart when the length-indicator indicates a length incommensurate with the unit of measure and said aliquot fractions thereof.

2. In a fabric measuring and computing machine, the combination of a length-indicator for indicating the length of a measurement in units of measure and aliquot fractions thereof, a chart bearing computed figures based on different prices, and corresponding to the units and aliquot fractions thereof indicated by the length-indicator, a measuring-roller mounted so as to be rotated by the fabric when pulled past the machine, means driven by the measuring-roller for actuating the length-indicator and the chart, marking means for marking the fabric at the point where it is to be cut off, a shutter for normally screening the chart to prevent reading of the same, means controlled by the actuation of the marking-means to open the shutter, and means mounted in the machine and operating automatically to inhibit the actuation of the last named means unless the length-indicator is indicating a measurement commensurate with the unit of measure and the said aliquot fractions thereof.

3. In a measuring and computing machine, the combination of means adapted to function in the operation of the machine to indicate measurements according to the law of the machine, and to display computations representing the product of the unit of measure or a multiple or fractional division thereof and different indications of value for such unit, a shutter for normally preventing visibility of the computations, marking means for marking the article at the point where it is to be cut off, means controlled by the actuation of the marking means to open the shutter, and means mounted in the machine and operating automatically to inhibit the actuation of the last named means unless the measurement indicated by the machine is commensurate with the unit of the measure and the said fractional divisions thereof.

4. In a measuring and computing machine, the combination of a length-indicator having pointer-means and a co-operating scale for indicating the length of a measurement in units of measure and aliquot fractions thereof, a chart bearing computed figures based on different prices and corresponding to the units and fractions thereof indicated by the length-indicator, a measuring-roller mounted so as to be rotated by the article to be measured, means driven by the measuring-roller for actuating the length-indicator and the chart, marking means for marking the article measured, at the point where it is to be cut off, and means controlled thereby and operating automatically to prevent the disclosure of the computed figures on the chart when the length-indicator indicates a length incommensurate with the unit of measure and said aliquot fractions thereof.

5. In a measuring and computing machine, the combination of a length-indicator having pointer-means and a co-operating scale for indicating the length of a measurement in units of measure and aliquot fractions thereof, a chart bearing computed figures based on different prices and corresponding to the units and fractions thereof indicated by the length-indicator, a measuring-roller mounted so as to be rotated by the article being measured, means driven by the measuring-roller for actuating the length-indicator and the chart, a shutter for normally screening the chart, an actuating member connected with the shutter for moving the same to display the chart, a rotary locking-member driven in unison with the length-indicator and the chart, said rotary locking-member and said actuating member having means co-operating to enable the locking-member to normally prevent the actuating member from moving the shutter, and operating to permit movement of the actuating member to move the shutter when the length-indicator indicates a length commensurate with the unit of measure and said aliquot fractions thereof, and means for moving the actuating member in a direction to open the shutter.

6. In a measuring and computing machine, the combination of a length-indicator having pointer-means and a co-operating scale for indicating the length of a measurement in units of measure and aliquot fractions thereof, a chart bearing computed figures based on different prices and corresponding to the units and fractions thereof indicated by the length-indicator, a measuring-roller mounted so as to be rotated by the article being measured, means driven by the measuring roller for actuating the length-indicator and the chart, a shutter for normally screening the chart, an actuating lever, and means connecting the same with the shutter to move the shutter to an open position to display the chart, a locking-wheel driven in synchrony with the length-indicator and the chart, and having the shape of its perimeter face such as to co-operate with the actuating lever to permit the actuating lever to move the shutter when the pointer-means indicates a length commensurate with the unit of measure and said aliquot fractions thereof, the face of said wheel operating in other positions of the pointer-means to prevent the actuation of the shutter by the actuating lever, and a hand-controlled member for operating the actuating lever.

7. In a measuring and computing machine, the combination of a length-indicator having pointer-means and a co-operating scale for indicating the length of a measurement in units of measure and aliquot fractions thereof, a chart bearing computed figures based on different prices and corresponding to the units and fractions thereof indicated by the length-indicator, a measuring-roller mounted so as to be rotated by the article being measured, means driven by the measuring-roller for actuating the length-indicator and the chart, a shutter for normally screening the chart, an actuating lever, and means connecting the same with the shutter to move the shutter to an open position to display the chart, a locking-wheel driven in synchrony with the length-indicator and the chart and the shape of its perimeter face such as to co-operate with the actuating lever to permit the actuating lever to move the shutter when the pointer-means indicates a length commensurate with the unit of measure and said aliquot fractions thereof, the face of said wheel operating in other positions of the pointer-means to prevent the actuation of the shutter by the actuating lever, a hand-actuated marking member to mark the article measured at the point where it is to be cut off, and means controlled thereby for yieldingly moving the actuating lever in a direction to open the shutter.

8. In a measuring and computing machine, the combination of a length-indicator having pointer-means and a co-operating scale for indicating the length of a measurement in units of measure and aliquot fractions thereof, a chart bearing computed figures based on different prices and corresponding to the units and fractions thereof indicated by the length-indicator, a measuring-roller mounted so as to be rotated by the article being measured, means driven by the measuring-roller for actuating the length-indicator and the chart, a presser-roller co-operating with the measuring-roller, a frame carried by the presser-roller, means for holding the presser-roller frame raised with the presser-roller removed from the measuring-roller, means for actuating the presser-roller frame to move the same into its raised position, a rotary locking-member driven in synchrony with the length-indicator and the chart, a shutter for normally screening the chart, an actuating lever for the shutter co-operating with the locking-member so that the locking-member normally maintains the shutter in a position to screen the chart, said locking-member having a construction permitting movement of the actuating lever when the indicator indicates a length commensurate with the units of measure and aliquot fractions thereof, and means actuated by the presser-roller frame for yieldingly moving the actuating lever in a direction to open the shutter.

9. In a measuring and computing machine, the combination of a length-indicator having pointer means and a co-operating scale for indicating the length of a measurement in units of measure and aliquot fractions thereof, a chart bearing computed figures based on different prices and corresponding to the units and fractions thereof indicated by the length-indicator, a measuring-roller mounted so as to be rotated by the article being measured, means driven by the measuring roller for actuating the length-indicator and the chart, a locking-wheel driven in synchrony with the length-indicator and the chart, so as to have a predetermined rotation to correspond to a movement of the length-indicator through one of the aliquot fractional divisions, a shutter for normally screening the chart, an actuating lever lying adjacent the locking-wheel and connected with the shutter, said locking-wheel having notches in the periphery thereof, and said actuating lever having a lug adapted to be received in either notch when the length-indicator indicates a number commensurate with the units of measure and the said fractions thereof, a presser-roller frame and presser-roller carried thereby, to co-operate with the measuring-roller, and means actuated by the presser-roller frame and including a spring for moving the actuating lever toward the locking-wheel, to open the shutter, said locking-wheel normally operating to prevent movement of the actuating lever and thereby prevent the shutter from being opened except when the indicator indicates a length commensurate with the units and aliquot fractions thereof.

10. In a measuring and computing machine, the combination of a length-indicator having pointer-means. and a co-operating scale for indicating the length of a measurement in units of measure and aliquot fractions thereof, a chart bearing computed figures based on different prices and corresponding to the units and fractions thereof indicated by the length-indicator, a measuring-roller mounted so as to be rotated by the article being measured, means driven by the measuring-roller for actuating the length-indicator and the chart, a presser-roller co-operating with the measuring roller, a frame carrying the presser-roller, means for holding the presser-roller frame raised with the presser-roller removed from the measuring-roller, means for actuating the presser-roller frame to move the same into its raised position, a locking-wheel driven in synchrony with the length-indicator and the chart, a shutter for normally screening the chart, said wheel having notches therein located so as to come opposite the lever when the length-indicator indicates a length commensurate with the units of measure and said aliquot fractions, thereby permitting a movement of the actuating lever to open the shutter.

11. In a measuring and computing machine, the combination of a measuring-roller, indicating mechanism actuated thereby including a length-indicator and a chart bearing computed figures based on different prices of the unit of measure, a knife-lever for marking the article measured at the point where it is to be cut off, a shutter for normally screening the chart, an actuating lever for the shutter, yielding means actuated by the knife lever for moving the actuating lever in a direction to open the shutter, and a locking-member co-operating with the the actuating lever to prevent movement of the lever and thereby prevent opening of the shutter except when the length-indicator indicates a length commensurate with a predetermined aliquot division of the unit of measure.

12. In a measuring and computing machine, the combination of a measuring-roller, indicating mechanism actuated thereby including a length-indicator and a chart bearing computed figures based on different prices of the unit of measure, a presser-roller, a presser-roller frame carrying the same, a knife lever operating to move the presser-roller frame to its raised position, a brake wheel rigid with the measuring-roller, a brake-plate co-operating therewith and actuated by the presser-roller frame to hold the measuring-roller against rotation when the presser-roller frame is raised, a shutter for normally screening the chart, an actuating lever for the shutter, yielding means for actuating the same by the brake-plate, and a locking-member co-operating with the actuating lever to prevent movement of the lever except when the length-indicator indicates a length commensurate with a predetermined aliquot division of the unit of measure.

In testimony whereof, I have hereunto set my hand.

JOHN L. WHEELER.